United States Patent [19]
Sasaki

[11] Patent Number: 6,036,578
[45] Date of Patent: Mar. 14, 2000

[54] NUMERICAL CONTROL UNIT INCORPORATING ULTRASONICALLY OSCILLATING TOOL

[75] Inventor: Shiori Sasaki, Tokyo, Japan

[73] Assignee: Ando Electric Co., Ltd., Tokyo, Japan

[21] Appl. No.: 09/156,840

[22] Filed: Sep. 18, 1998

[30]     Foreign Application Priority Data

Sep. 30, 1997   [JP]   Japan ................................... 9-267468

[51] Int. Cl.⁷ ................................................. B24B 49/00
[52] U.S. Cl. ................................ 451/5; 451/165; 451/910
[58] Field of Search .............................. 451/165, 5, 56, 451/11, 27, 36, 37, 164, 910; 83/956

[56]             References Cited

U.S. PATENT DOCUMENTS

| | | | |
|---|---|---|---|
| 4,343,111 | 8/1982 | Inoue ........................................ | 451/165 |
| 5,101,599 | 4/1992 | Takabayasi et al. ..................... | 451/165 |
| 5,116,343 | 5/1992 | Ams et al. ................................ | 451/165 |
| 5,177,902 | 1/1993 | Baba et al. ............................... | 451/165 |
| 5,478,270 | 12/1995 | Cuomo et al. ........................... | 451/165 |

*Primary Examiner*—Derris H. Banks
*Attorney, Agent, or Firm*—Flynn, Thiel, Boutell & Tanis, P.C.

[57]                ABSTRACT

The invention provides a NC unit provided with an ultrasonically oscillating tool, capable of indenting pits at equal pitches and detecting an amount of wastage of a stylus. In the NC unit, a PLL circuit outputs an ultrasonic signal S at a frequency equivalent to the resonant frequency of the ultrasonically oscillating tool and the frequency of the output signal S undergoes changes following up any change in the resonant frequency due to wear and tear of the stylus. Accordingly, the frequency of the output signal S has a value corresponding to the amount of wastage of the stylus. A frequency detection circuit 40 detects the frequency of the output signal S, and delivers data indicating the frequency to a CPU. When applying a process for indenting pits at equal pitches, the CPU changes over a synchronizing/changeover circuit so as to deliver the output signal S from the PLL circuit to an interpolative operation circuit. This will cause traveling velocities of respective motors to be synchronized with an oscillation speed of the stylus of the ultrasonically oscillating tool thus enabling indentation of the pits at equal pitches.

3 Claims, 5 Drawing Sheets

NUMERICAL CONTROL UNIT INCORPORATING ULTRASONICALLY OSCILLATING TOOL

BACKGROUND OF THE INVENTION

1. Field of the Invention

The invention relates to a numerical control (NC) unit provided with an ultrasonically oscillating tool capable of forming an iridescent face (like, for example, a CD face with a track of pits indented thereon) directly on the surface of a die by, for example, applying micro-indentation treatment to the die.

2. Description of the Related Art

The configuration of a conventional NC unit provided with an ultrasonically oscillating tool is described with reference to FIGS. 2 to 4. The NC unit is in principle not affected by the number of axes, and may be of a θ-axis control type, however, for convenience of description, an orthogonal biaxial NC unit is described hereinafter as a typical example.

In FIG. 2, reference numeral 1 denotes an X-axis motor, 2 a Y-axis motor, 3 an X-axis pole thread, 4 a Y-axis pole thread, 6 an ultrasonically oscillating tool, and 7 a work piece to be processed (referred to hereafter as a work).

The ultrasonically oscillating tool 6 is mounted so as to be able to travel on the X-axis pole thread 3, and indents pits on the surface of the work 7 through interpolative control by the Y-axis motor 2 and the X-axis motor 1 traveling on the Y-axis pole thread 4.

A conventional oscillation control circuit for the ultrasonically oscillating tool 6 is described with reference to FIG. 3, and a conventional driving circuit for driving the X-axis motor 1 and the Y-axis motor 2 is described with reference to FIG. 4.

In FIG. 3, reference numeral 11 denotes an oscillation circuit for generating an ultrasonic signal 12 an amplifier circuit, 13 a matching circuit for impedance matching, 6 the ultrasonically oscillating tool, 15 a piezoelectric element, 16 a horn, and 17 a stylus.

The signal generated by the oscillation circuit 11 is amplified in the amplifier circuit 12, and via the matching circuit, causes the piezoelectric element 15 to be oscillated. At this point in time, if the piezoelectric element 15 is oscillated at frequency f satisfying the following expression:

$$f = C/4L$$

where C is specific acoustic impedance determined by the horn 16 and the stylus 17, and L is the whole length from the top of the horn to the tip of the stylus, ultrasonic oscillation occurs to the ultrasonically oscillating tool 6 due to the effect of resonant relationship.

In FIG. 4, reference numeral 21 denotes a CPU (central processing unit), 22 a DPU (dual port memory), 23 an interpolative operation circuit, 24 an FGC (function generator: frequency modulator), 25 a sensor input circuit, 26 a control output circuit, 27,28 servoamplifiers, 1,2 the motors described with reference to FIG. 2, and 30, 31 rotation sensors for outputting pulses in number proportional to the rotation angle of the motors 1, and 2, respectively.

With the configuration described above, coordinate data written to the DPM 22 by the CPU 21 is processed for interpolative operation by the interpolative operation circuit 23, and outputted to the control output circuit 26 at a timing synchronized with a synchronous pulse CP outputted from the FGC 24.

The control output circuit 26 generates a motor driving signal based on an output of the interpolative operation circuit 23, and sends out the same to the servoamplifiers 27, 28 at a timing according to the synchronous pulse CP. This causes the motors 1, 2 to be driven for rotation. A rotation angle of the motors 1, 2, respectively, is detected by the rotation sensors 30, 31, and an output of the rotation sensors 30, 31, respectively, is fed back to the servoamplifiers 27, 28, and simultaneously delivered to the sensor input circuit 25. The sensor input circuit 25, upon receiving the outputs of the rotation sensors 30, 31, sends out rotation angle signals based on the outputs to the interpolative operation circuit 23. The interpolative operation circuit 23 recognizes the present location of the ultrasonically oscillating tool 6 from the outputs of the sensor input circuit 25.

With the conventional NC unit provided with the ultrasonically oscillating tool, the circuits (in FIG. 3) for driving the ultrasonically oscillating tool 6 are asynchronous with the circuits (in FIG. 4) for causing the same to travel, and consequently, pits could not be indented at identical pitches as shown in FIGS. 5(A) and 5(B) when an ultrasonic processing is applied to the work, causing an undesirable problem particularly when a process for forming an iridescent face is applied.

Further, with the conventional unit described above, any shift in resonant frequency, if and when occurs due to wear and tear of the stylus 17, could not be detected, causing a problem of faulty oscillation after use thereof over many hours.

SUMMARY OF THE INVENTION

In the light of the problems described above, the invention has been developed, and an object of the invention is to provide a NC unit provided with an ultrasonically oscillating tool capable of indenting pits at equal pitches. Another object of the invention is to provide a NC unit provided with an ultrasonically oscillating tool capable of detecting an amount of wastage of a stylus.

To this end, the NC unit provided with the ultrasonically oscillating tool according to the invention comprises an ultrasonic signal generation means for generating an ultrasonic signal, the ultrasonically oscillating tool driven by an output of the ultrasonic signal generation means, motors causing the ultrasonically oscillating tool to travel, a synchronous signal generation means for generating a synchronous signal, a selection means for delivering either of the output of the ultrasonic signal generation means and an output of the synchronous signal generation means, and a motor driving means for driving the motors at a speed synchronized with an output of the selection means.

The NC unit according to the invention further comprises a frequency detection means for detecting an output frequency of the ultrasonic signal generation means.

Furthermore, in the NC unit provided with the ultrasonically oscillating tool according to the invention, the motor driving means comprises an interpolative operation means for interpolating a value of a new location command for the ultrasonically oscillating tool, the motors being driven on the basis of an output of the interpolative operation means.

DESCRIPTION OF THE PREFERRED EMBODIMENTS

Figure 1:
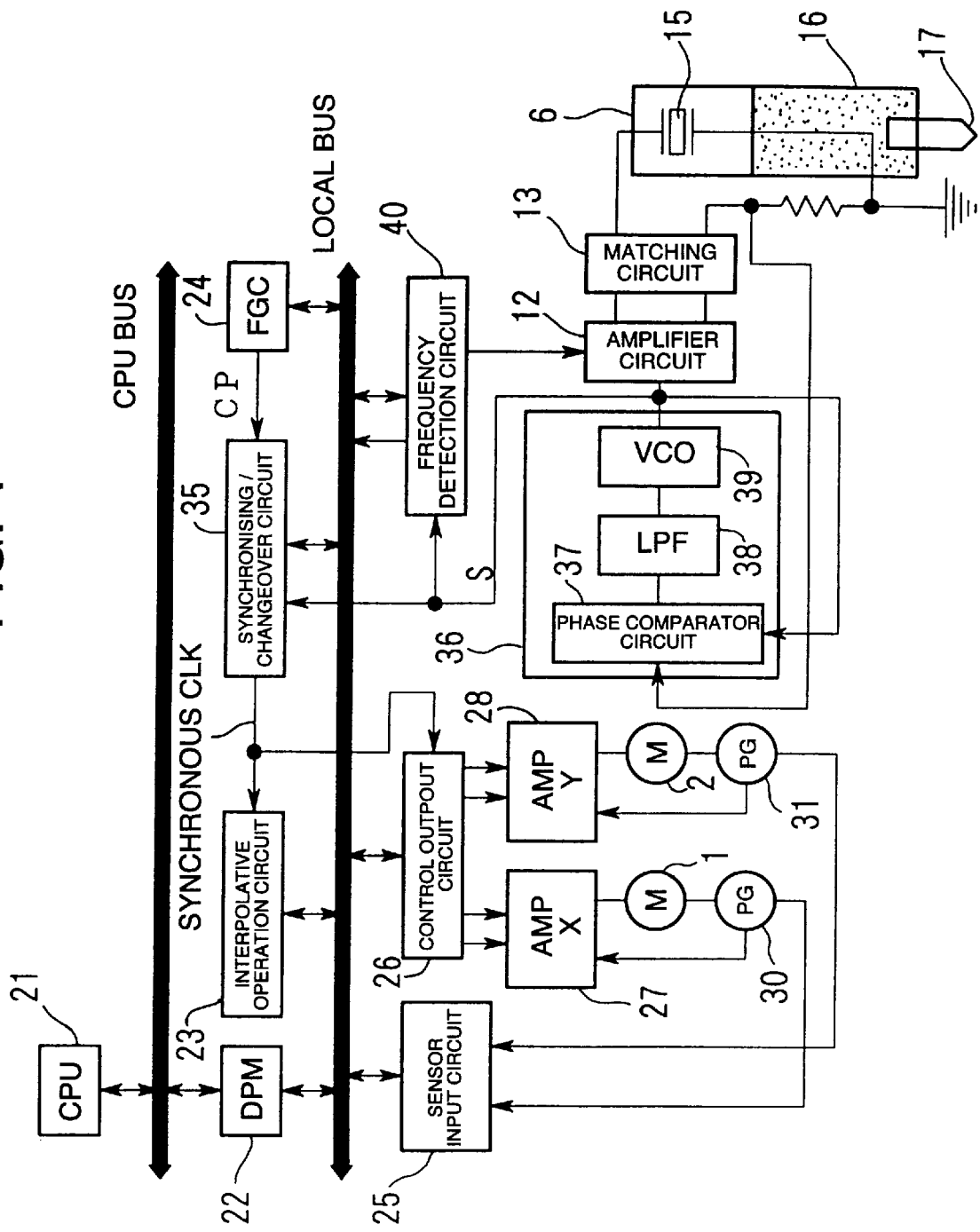
FIG. 1 is a block diagram showing the configuration of an embodiment of a NC unit according to the invention.
Figure 2:
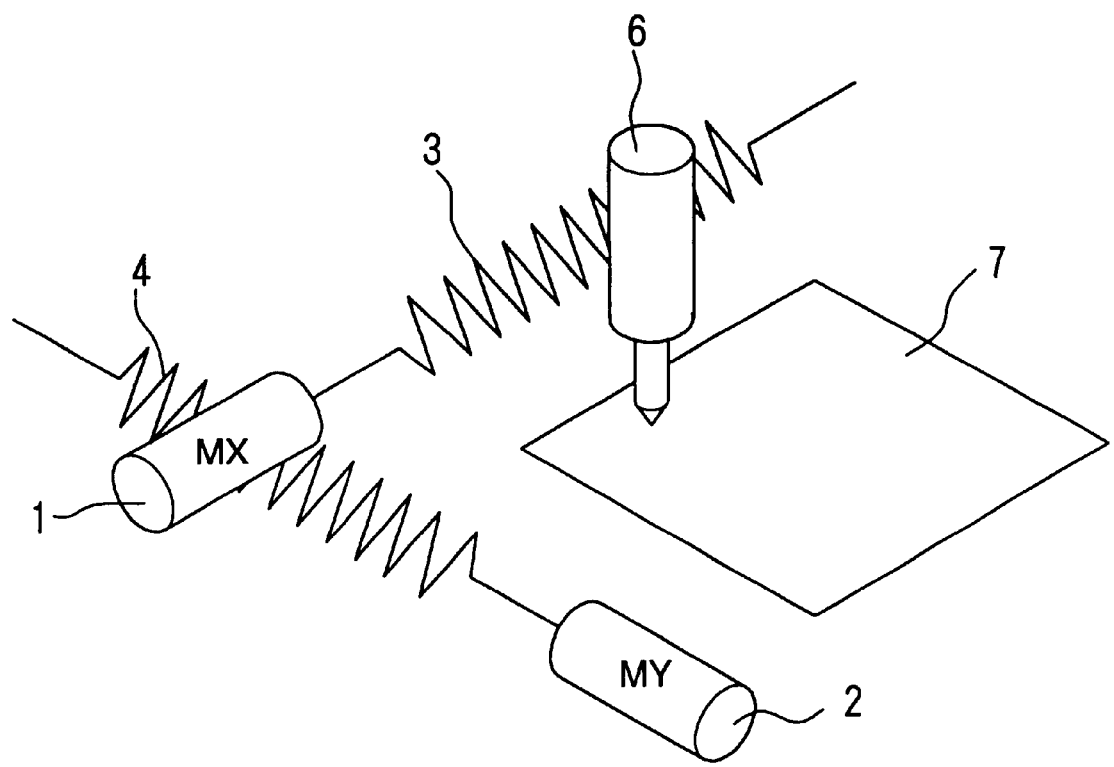
FIG. 2 is a schematic illustration showing an ultrasonically oscillating tool and the NC unit for causing the tool to travel.
Figure 3:
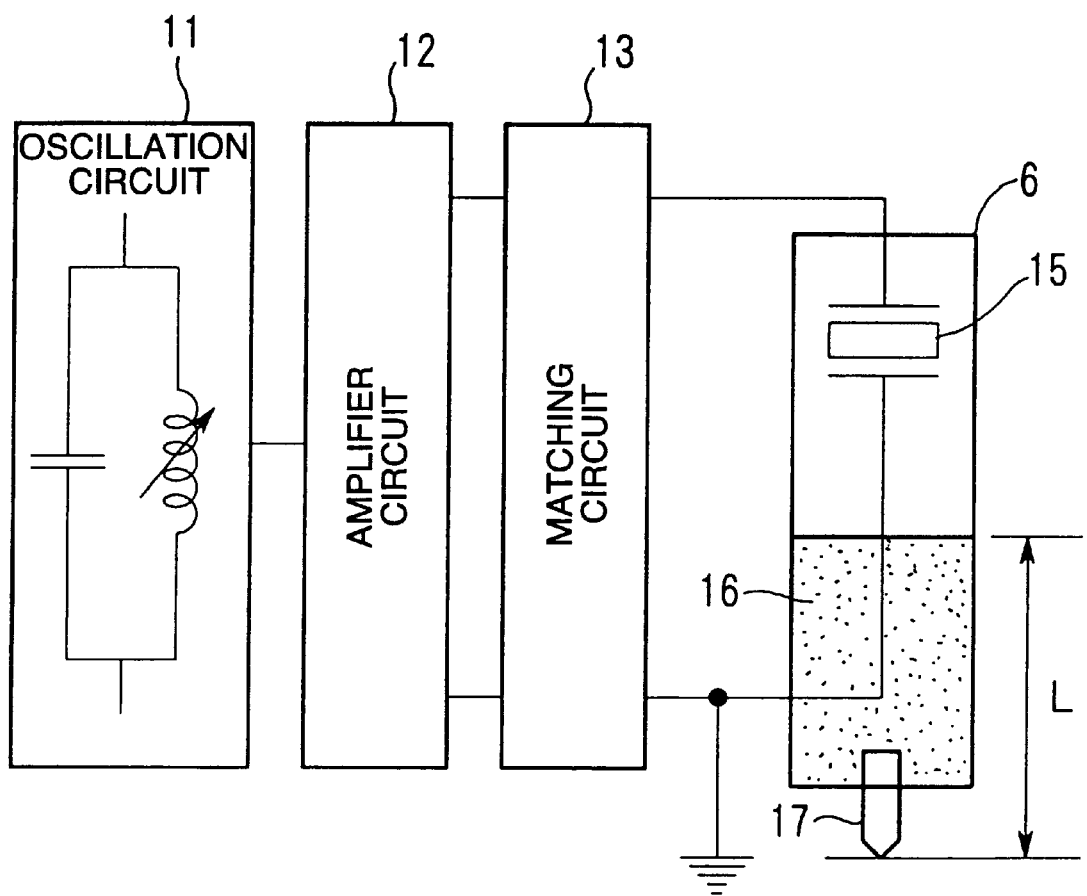
FIG. 3 is a block diagram showing the configuration of a conventional driving circuit for driving the ultrasonically oscillating tool.
Figure 4:
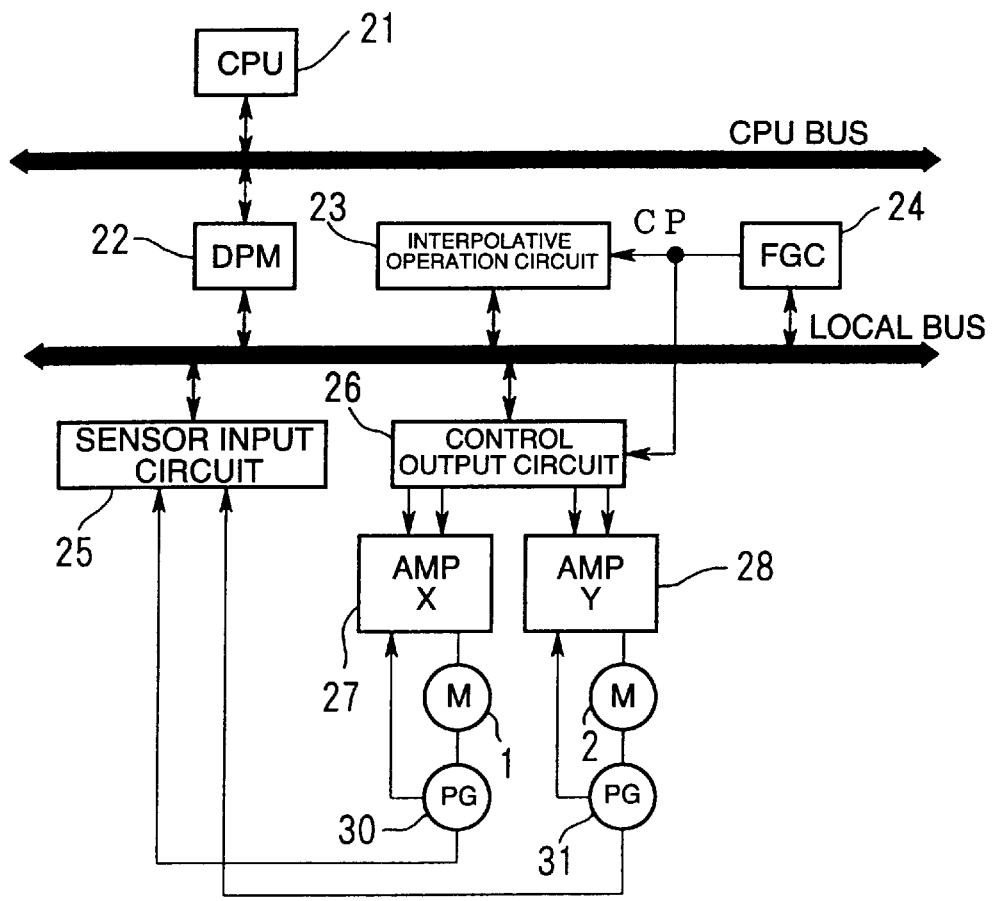
FIG. 4 is a block diagram showing the configuration of conventional circuits for causing the ultrasonically oscillating tool to travel.
Figure 5:
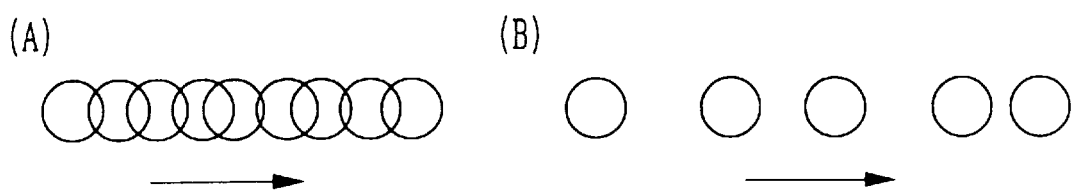
FIGS. 5(A) and 5(B) are views showing the state of pits indented in the conventional manner by the ultrasonically oscillating tool by way of example.

An embodiment of the invention is described hereinafter with reference to the accompanying drawings. FIG. 1 is a block diagram showing the configuration of the embodiment of a NC unit according to the invention, and in FIG. 1, parts corresponding to those in FIGS. 3 and 4 are denoted by the same reference numerals, description thereof being omitted.

In FIG. 1, a synchronizing/changeover circuit 35 selects either of a synchronous pulse CP outputted from a FGC 24 and an output signal S from a PLL (phase locked loop) circuit 36 according to selection data outputted from a CPU 21, and sends out a selected one as a synchronous CLK to the interpolative operation circuit 23. The PLL circuit 36 comprises a phase comparator circuit 37, a LPF (low pass filter) 38, and a VCO (voltage controlled oscillator) 39. The phase comparator circuit 37 compares the phase of a current waveform of a piezoelectric element 15 with that of an output signal S of the VCO 39, and outputs the result of such comparison to the VCO 39 via the LPF 38. The VCO 39 is caused to oscillate at a frequency proportional to an output of the LPF 38, and delivers an oscillation output in the form of an ultrasonic signal S. A frequency detection circuit 40 detects a frequency of the output signal S from the PLL circuit 36, and outputs frequency data indicating a detected frequency to the CPU 21.

Now, the operation of the circuits shown in FIG. 1 is described hereinafter.

At first, the PLL circuit 36 outputs the ultrasonic signal S at a frequency equivalent to the resonant frequency of an ultrasonically osculating tool 6, and the frequency of the output signal S undergoes changes following up any change of the resonant frequency occurring due to wear and tear of a stylus 17. Accordingly, the frequency of the output signal S will have a value corresponding to an amount of wastage of the stylus 17. The frequency detection circuit 40 detects the frequency of the output signal S, and outputs the data indicating the detected frequency to the CPU 21. The data enables the CPU 21 to detect the amount of wastage of the stylus 17.

In the case of applying a process other than the process of forming an iridescent face to a die, the CPU 21 changes over the synchronizing/changeover circuit 35 so as to deliver the synchronous pulse CP outputted from the FGC 24 to the interpolative operation circuit 23. This will cause the motors 1, 2 to be driven thereafter at velocities synchronized with the synchronous pulse CP as in the case of the conventional NC unit. In this case, the speed of the motors 1, 2, respectively, may be changed if the frequency of the synchronous pulse CP is changed by the CPU 21 outputting a control signal to the FGC 24, however, there is no guarantee that pits are indented at equal pitches.

Then, in the case of applying the process of forming an indescent face to a die, the CPU 21 changes over the synchronizing/changeover circuit 35 so as to deliver the output signal S from the PLL circuit 36 to the interpolative operation circuit 23. This will cause the motors 1, 2 to be driven thereafter at velocities synchronized with the output signal S. In this case, since a traveling speed of the motors 1, 2, respectively, is synchronized with an oscillation speed of the stylus 17 of the ultrasonically oscillating tool 6, indentation of the pits at equal pitches can be guaranteed, but the CPU 21 is unable to change the traveling speed of the motors 1, 2, respectively.

Figure 6:
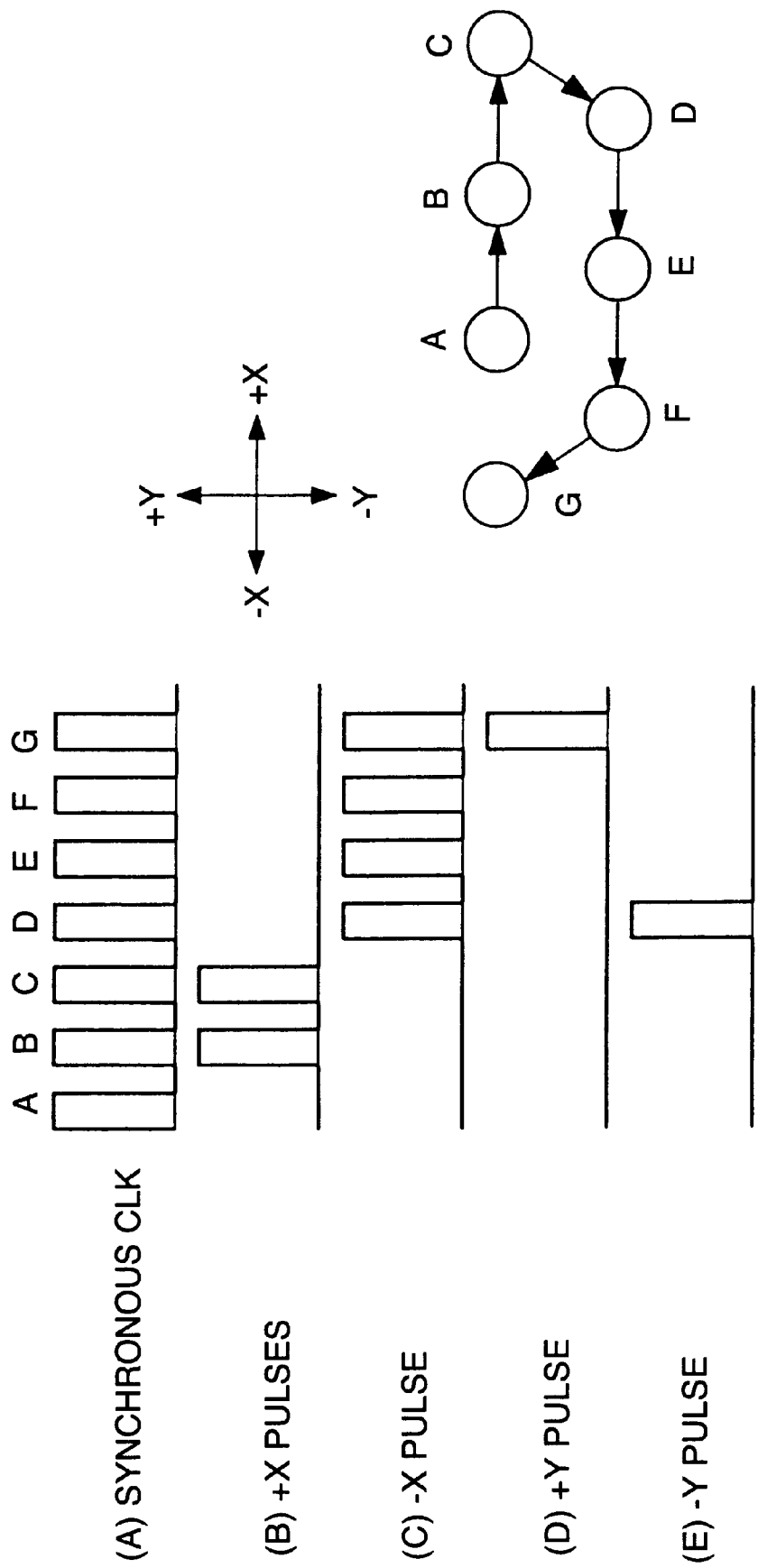
FIGS. 6(A)–6(E) are views showing an example of pits indentation according to the embodiment of the NC unit of the invention shown in FIG. 1 and waveforms of outputs from respective parts thereof.

FIG. 6 shows by way of example the locus of the pits indented at equal pitches as described in the foregoing and waveforms of outputs from respective parts of the unit. In FIG. 6(A) is a waveform chart of the synchronous CLK outputted from the synchronizing/changeover circuit 35. FIG. 6(B) is a waveform chart of a pulse for giving the motor 1 a directive to travel towards +X direction. FIG. 6(C) is a waveform chart of a pulse for giving the motor 1 a directive to travel towards –X direction. FIG. 6(D) is a waveform chart of a pulse for giving the motor 2 a directive to travel towards +Y direction. FIG. 6(E) is a waveform chart of a pulse for giving the motor 2 a directive to travel towards –Y direction A pit chart shown in the right side corner of the figure indicates movement of the location of each pit by the pulses described above.

The NC unit according to the invention comprises an ultrasonic signal generation means for generating the ultrasonic signal, the ultrasonically oscillating tool driven by an output of the ultrasonic signal generation means, the motors causing the ultrasonically oscilating tool 6 to travel, a synchronous signal generation means for generating a synchronous signal a selection means for delivering either of the output of the ultrasonic signal generation means and an output of the synchronous signal generation means, and a motor driving means for driving the motors at a speed synchronized with an output of the selection means. Hence, the oscillation of the ultrasonically oscillating tool can be synchronized with the driving of the motors, enabling a process of indenting pits at equal pitches to be performed.

The NC unit according to the invention further comprises a frequency detection means for detecting an output frequency of the ultrasonic signal generation means, enabling an amount of wastage of the stylus to be detected.

What is claimed is:

1. A numerical control unit provided with an ultrasonically oscillating tool comprising:

an ultrasonic signal generation means for generating an ultrasonic signal;

the ultrasonically oscillating tool driven by an output of the ultrasonic signal generation means;

motors causing the ultrasonically oscillating tool to travel;

a synchronous signal generation means for generating a synchronous signal;

a selection means for delivering either of the output of the ultrasonic signal generation means and an output of the synchronous signal generation means; and a motor diving means for driving the motors at a speed synchronized with an output of the selection means.

2. A numerical control unit provided with an ultrasonically oscillating tool according to claim 1, further comprising a frequency detection means for detecting an output frequency of the ultrasonic signal generation means.

3. A numerical control unit provided with an ultrasonically oscillating tool according to claim 1, wherein the motor driving means comprises an interpolative operation means for interpolating a value of a new location command for the ultrasonically oscillating tool, the motors being driven on the basis of an output of the interpolative operation means.

* * * * *